(12) United States Patent
Thayamballi

(10) Patent No.: US 8,456,980 B1
(45) Date of Patent: Jun. 4, 2013

(54) DISK DRIVE COMPENSATING FOR LASER INDUCED HEAD PROTRUSION IN HEAT ASSISTED MAGNETIC RECORDING

(75) Inventor: Pradeep K. Thayamballi, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/418,904

(22) Filed: Mar. 13, 2012

(51) Int. Cl.
*G11B 7/00* (2006.01)
*G11B 11/00* (2006.01)

(52) U.S. Cl.
USPC ............................................. 369/116; 360/59

(58) Field of Classification Search
USPC ............... 369/116, 47.51, 47.52, 47.53, 120, 369/121, 122; 360/59
See application file for complete search history.

(56) References Cited

U.S. PATENT DOCUMENTS

| | | | |
|---|---|---|---|
| 5,392,273 A | 2/1995 | Masaki et al. | |
| 5,805,559 A | 9/1998 | Murakami et al. | |
| 6,046,970 A | 4/2000 | DeCusatis et al. | |
| 6,359,433 B1 | 3/2002 | Gillis et al. | |
| 6,636,460 B2 | 10/2003 | Akiyama et al. | |
| 6,771,440 B2 | 8/2004 | Smith | |
| 6,804,189 B2 * | 10/2004 | Inase et al. | 369/275.3 |
| 6,950,260 B2 | 9/2005 | Coffey et al. | |
| 6,975,472 B2 | 12/2005 | Stover et al. | |
| 7,023,647 B2 | 4/2006 | Bloodworth et al. | |
| 7,095,577 B1 | 8/2006 | Codilian et al. | |
| 7,099,097 B2 | 8/2006 | Hamaguchi et al. | |
| 7,161,882 B2 | 1/2007 | Lehr et al. | |
| 7,177,253 B2 | 2/2007 | Ishibashi et al. | |
| 7,324,299 B1 | 1/2008 | Schreck et al. | |
| 7,400,473 B1 | 7/2008 | Krajnovich et al. | |
| 7,412,143 B2 | 8/2008 | Rottmayer et al. | |
| 7,502,205 B1 | 3/2009 | Hurtado et al. | |
| 7,724,470 B2 | 5/2010 | Poon et al. | |
| 7,876,655 B2 | 1/2011 | Sasaki | |
| 7,898,759 B2 | 3/2011 | Matsumoto et al. | |
| 7,990,647 B2 | 8/2011 | Lille | |
| 7,995,425 B2 | 8/2011 | Schreck et al. | |
| 2002/0136115 A1 | 9/2002 | Kadlec et al. | |
| 2006/0233061 A1 | 10/2006 | Rausch et al. | |

(Continued)

OTHER PUBLICATIONS

Lawrence A. Johnson, "Accelerated Aging Test of 1310 nm Laser Diodes", ILX Lightwave Application Note #29, May 31, 2006, http://www.ilxlightwave.com/appnotes/AN%2029%20REV01%20Accelerated%20Aging%20Test%20of%201310nm%20LD.pdf.

(Continued)

*Primary Examiner* — Nabil Hindi

(57) ABSTRACT

A disk drive is disclosed comprising a head actuated over a disk comprising a plurality of data tracks defined by servo sectors. The head comprises a laser operable to heat the disk while writing data to the disk and a fly height actuator operable to adjust a fly height of the head over the disk. When the head approaches a target data sector of a write command, the fly height of the actuator adjusts the fly height of the head to a target pre-heat fly height during a pre-heat interval. After the pre-heat interval and during a pre-laser interval, the fly height actuator increases the fly height of the head. After the pre-laser interval, a power applied to the laser is increased to heat the disk, wherein the pre-laser interval compensates for a protrusion transient of the head toward the disk due to increasing the power applied to the laser.

20 Claims, 3 Drawing Sheets

U.S. PATENT DOCUMENTS

| | | |
|---|---|---|
| 2007/0014041 A1 | 1/2007 | Lille et al. |
| 2007/0230012 A1 | 10/2007 | Erden et al. |
| 2008/0158730 A1 | 7/2008 | Furukawa et al. |
| 2009/0207519 A1 | 8/2009 | Erden et al. |
| 2009/0225464 A1 | 9/2009 | Juang et al. |
| 2009/0251828 A1 | 10/2009 | Schreck et al. |
| 2009/0303629 A1 | 12/2009 | Nakano et al. |
| 2010/0123967 A1 | 5/2010 | Batra et al. |

OTHER PUBLICATIONS

Patrick Gale, "Estimating Laser Diode Lifetimes and Activation Energy", ILX Lightwave Application Note 33, 2008, http://www.ilxlightwave.com/appnotes/AN%2033%20REV01%20Estimating%20Laser%20Diode%20Lifetimes%20&%20Activation%20Energy.pdf.

* cited by examiner

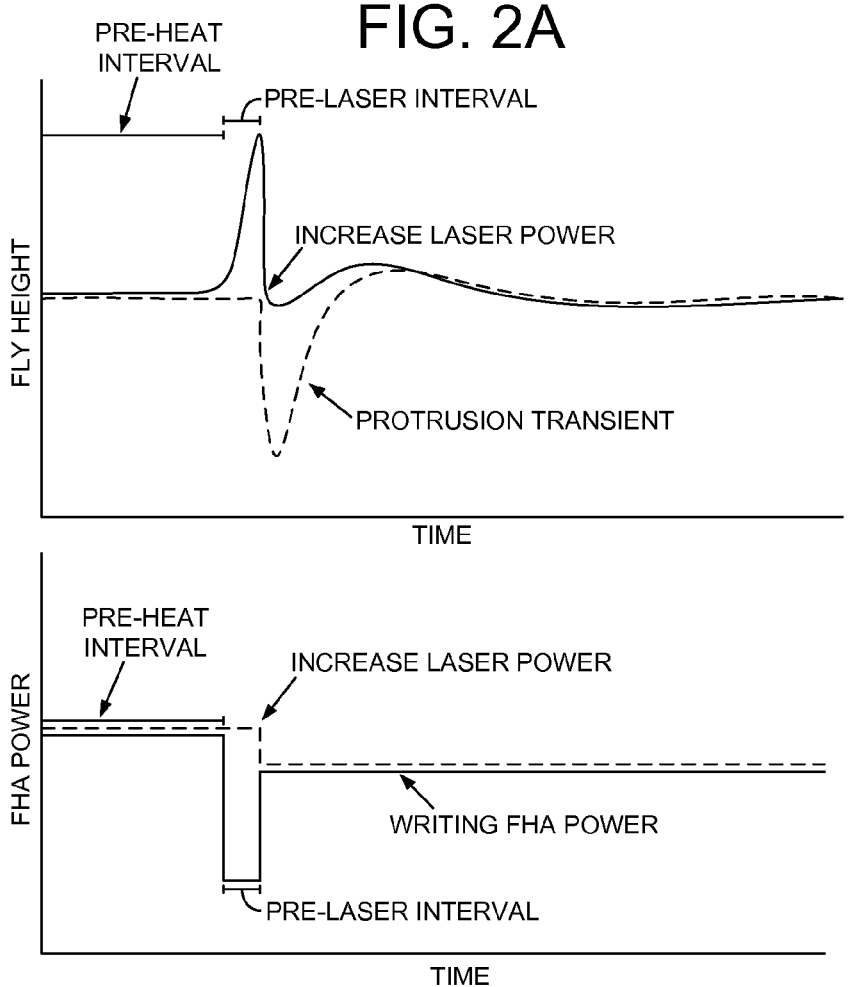
FIG. 2A
FIG. 2B
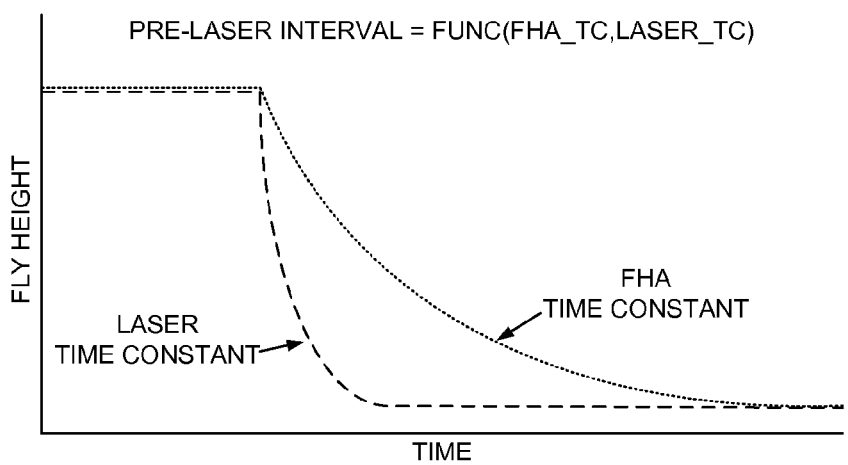
FIG. 3

DISK DRIVE COMPENSATING FOR LASER INDUCED HEAD PROTRUSION IN HEAT ASSISTED MAGNETIC RECORDING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

BRIEF DESCRIPTION OF THE DRAWINGS

FIGS. 2A and 2B illustrate an embodiment of the present invention for increasing the fly height of the head during the pre-laser interval.

FIG. 3 illustrates an embodiment of the present invention wherein the pre-laser interval is based on the fly height actuator time constant and the laser time constant.

DETAILED DESCRIPTION

Figure 1A:
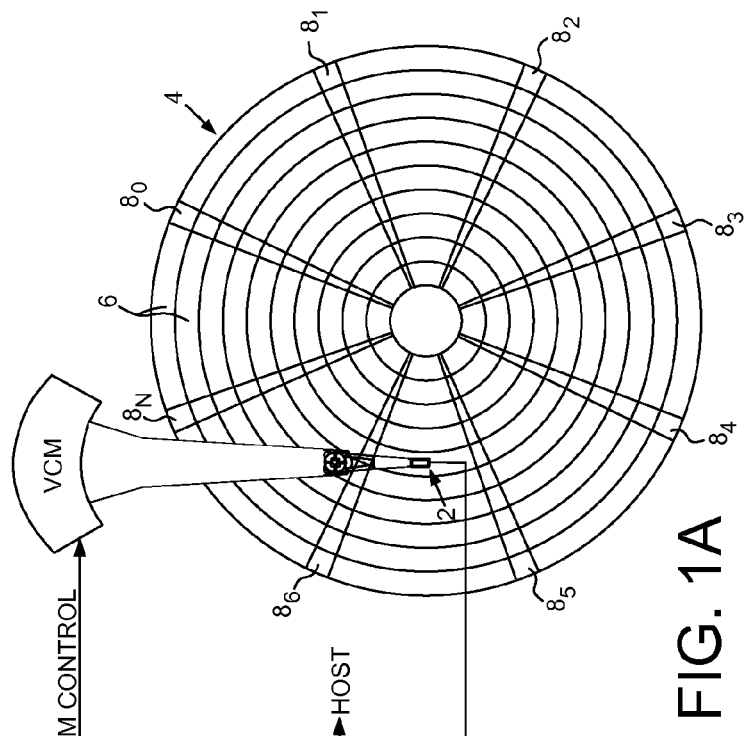
FIG. 1A shows a disk drive according to an embodiment of the present invention comprising a head actuated over a disk comprising a plurality of data tracks defined by servo sectors.
Figure 1B:
FIG. 1B shows an embodiment of the present invention wherein the head comprises a laser operable to heat the disk while writing data to the disk and a fly height actuator operable to adjust a fly height of the head over the disk.
Figure 1C:
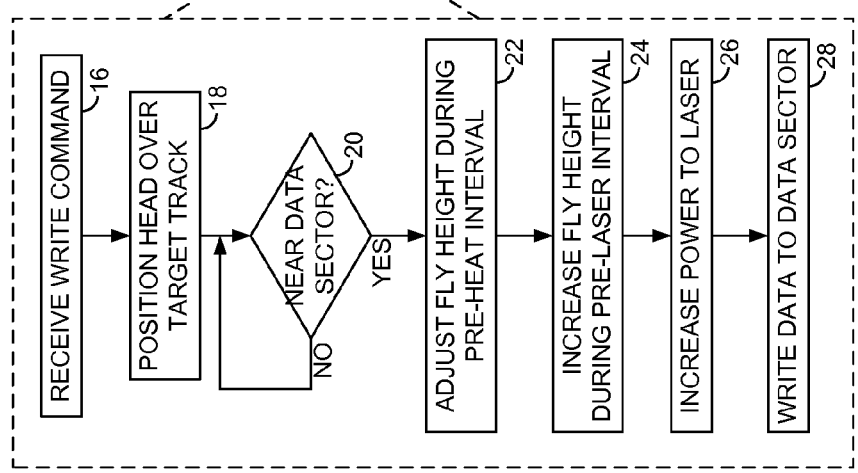
FIG. 1C is a flow diagram according to an embodiment of the present invention wherein the fly height of the head is increased during a pre-laser interval in order to compensate for a protrusion transient of the head toward the disk due to increasing the power applied to the laser at the beginning of a write operation.

FIG. 1A shows a disk drive according to an embodiment of the present invention comprising a head 2 actuated over a disk 4 comprising a plurality of data tracks 6 defined by servo sectors $8_0$-$8_N$, wherein each data track comprises a plurality of data sectors. FIG. 1B shows an embodiment wherein the head 2 comprises a laser 10 operable to heat the disk 4 while writing data to the disk 4 and a fly height actuator 12 operable to adjust a fly height of the head 2 over the disk 4. The disk drive further comprises control circuitry 14 operable to execute the flow diagram of FIG. 1C, wherein a write command is received to write data to a target data sector of a target data track (block 16). The head 2 is positioned over the target data track (block 18), and when the head 2 approaches the target data sector (block 20) the fly height actuator adjusts the fly height of the head to a target pre-heat fly height during a pre-heat interval (block 22). After the pre-heat interval and during a pre-laser interval, the fly height actuator increases the fly height of the head (block 24). After the pre-laser interval, a power applied to the laser is increased to heat the disk (block 26), wherein the pre-laser interval compensates for a protrusion transient of the head 2 toward the disk 4 due to increasing the power applied to the laser. After increasing the power applied to the laser, data is written to the disk (block 28).

Any suitable fly height actuator 12 may be employed in the embodiments of the present invention, such as a heater which controls the fly height through thermal expansion, or a piezoelectric (PZT) actuator which may deflect toward the disk when energized (e.g., with a driving voltage). The fly height actuator 12 is controlled to maintain the head at a target fly height during write and read operations. When not performing write/read operations, the fly height actuator 12 may be controlled to increase the fly height of the head so as to avoid collisions with asperities on the disk.

Any suitable laser 10 may be employed in the embodiments of the present invention, such as a laser diode. In addition, embodiments of the present invention may employ any suitable techniques for focusing the laser 10 on the disk 4, such as a suitable waveguide, magnifying lens, or other suitable elements. Also in the embodiment of FIG. 1B, the head 2 comprises a write element 30 (e.g., an inductive coil) and a read element 32 (e.g., a magnetoresistive read element). During write operations the power applied to the laser 10 is increased in order to heat the disk 4, thereby decreasing the coercivity so that the data is written more reliably. The write power of the laser 10 may be calibrated periodically to ensure optimal heating over the life of the disk drive, and because the laser's output may degrade over time.

FIG. 2A shows a dashed line illustrating an example protrusion transient of the head 2 toward the disk 4 due to the heating effect when the laser power is increased at the beginning of a write operation. The dashed line in FIG. 2B shows an example power applied to the fly height actuator 12 corresponding to the dashed line in FIG. 2A. The fly height actuator 12 is controlled during a pre-heat interval to adjust the fly height of the head 2, and in one embodiment, the fly height is adjusted during the pre-heat interval to a target pre-heat fly height used during the write operation as illustrated in FIG. 2A. When the power is increased to the laser 10 and the write current is applied to the write element 30, the power applied to the fly height actuator 12 is decreased (as shown by the dashed line) to account for the heating effect of the laser 10 and the write current. That is, the heating caused by the laser 10 and the write current may cause a thermal expansion of the head toward the disk, and therefore the power applied to the fly height actuator 12 may be reduced by a corresponding amount. However, because the time constant of the laser 10 is significantly less than the time constant of the fly height actuator 12, the head 2 initially protrudes toward the disk 4 when the laser power is increased as illustrated by the dashed line of FIG. 2A. The head 2 then retracts toward the target fly height as the fly height actuator 12 adjusts (e.g., cools) at a rate that is slower than the heating effect of the laser 10.

The protrusion transient shown in the dashed line of FIG. 2A is undesirable as it may cause the head to collide with the disk or an asperity on the disk. Accordingly, in one embodiment the fly height actuator 12 is controlled to increase the fly height of the head during a pre-laser interval prior to increasing the laser power at the beginning of a write operation. This is illustrated in FIG. 2A as a solid line wherein in one embodiment the fly height increases according to a time constant of the fly height actuator 12. FIG. 2B shows a corresponding solid line wherein in this embodiment the fly height of the head is increased by decreasing the power applied to the fly height actuator 12 using a step function (although the power may be decreased using any suitable function). At the end of the pre-laser interval, the fly height actuator 12 is controlled by applying a power that maintains a target write fly height during the write operation, including to account for the heating effect of the laser 10 and write current. Increasing the fly height of the head during the pre-laser interval compensates for the protrusion transient of the head toward the disk when the laser power is increased as illustrated by the solid line of FIG. 2A.

The pre-laser interval may comprise any suitable duration in order to reduce the protrusion transient of the head toward the disk. FIG. 3 shows an embodiment wherein the time constant of the laser 10 is significantly less than the time constant of the fly height actuator 12. In this embodiment, the time constants are defined relative to how fast the head 2 protrudes toward the disk 4 after increasing the power applied to the laser 10 and to the fly height actuator 12 respectively. In one embodiment, the pre-laser interval is based on the time constants of the laser 10 and the fly height actuator 12, for example, based on a ratio of the fly height actuator 12 time constant to the laser 10 time constant.

In the embodiment of FIG. 2A, the fly height actuator 12 is controlled during the pre-heat interval to adjust the fly height of the head to the same target fly height as that used during the write operation. In other embodiments, the fly height actuator 12 may adjust the fly height of the head during the pre-heat interval to a level different from the target fly height used during the write operation. For example, the fly height during the pre-heat interval may be higher than the target write fly height during the write operation, with a corresponding adjustment to the pre-laser interval and/or the function that controls the fly height actuator 12 during the pre-laser interval.

In one embodiment, the pre-laser interval may be adjusted over time to account for changes in the laser 10. For example, the laser may degrade over the life of the disk drive which may change the resulting protrusion transient at the beginning of write operations. In one embodiment, the laser power may be periodically recalibrated in order to account for a degrading laser 10. When the laser power is recalibrated, there may be a corresponding recalibration of the pre-laser interval and/or the function that controls the fly height actuator 12 during the pre-laser interval.

Figure 4A:
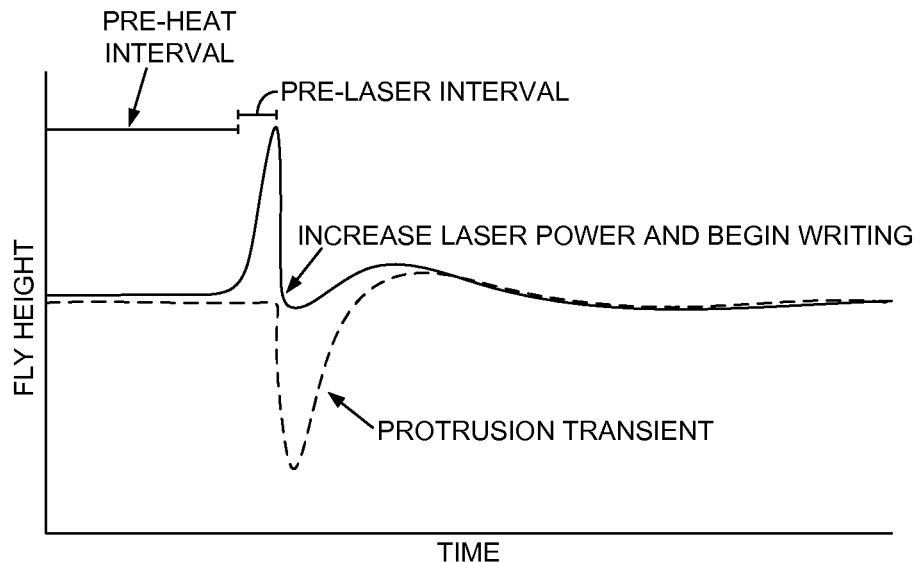
FIG. 4A illustrates an embodiment of the present invention wherein data is written to the disk during the protrusion transient.
Figure 4B:
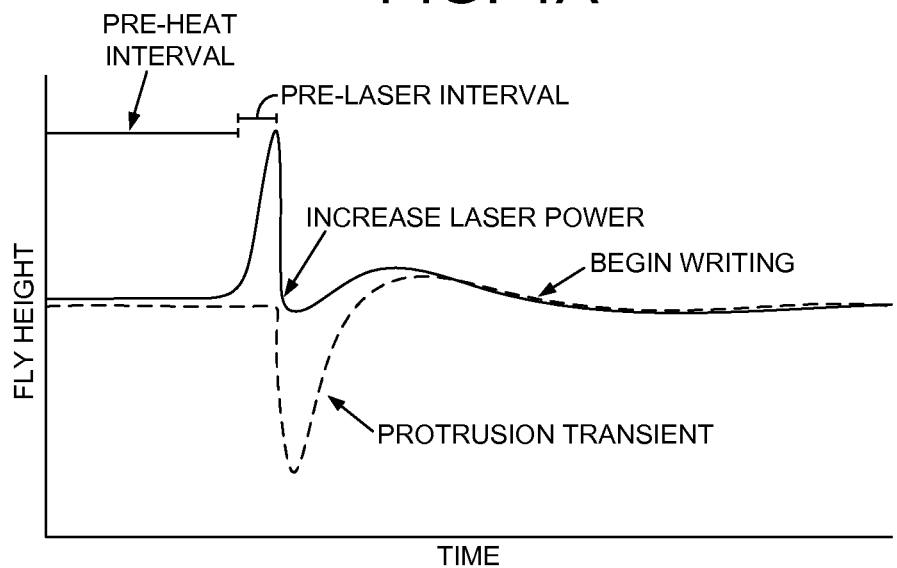
FIG. 4B illustrates an embodiment of the present invention wherein data is written to the disk after the protrusion transient.

FIG. 4A shows an embodiment of the present invention wherein the control circuitry may begin writing data to the disk at essentially the same time (or slightly after) increasing the power to the laser 10 at the beginning of the write operation. In this embodiment, the control circuitry writes data to the disk during the protrusion transient in order to maximize the usable disk space. In another embodiment illustrated in FIG. 4B, the control circuitry may delay writing data to the disk until after the protrusion transient has substantially settled. This embodiment may improve the reliability of the written data by waiting until the fly height settles to the target fly height before applying the write current to the write element.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:
1. A disk drive comprising:
a disk comprising a plurality of data tracks defined by servo sectors, wherein each data track comprises a plurality of data sectors;
a head actuated over the disk, wherein the head comprises a laser operable to heat the disk while writing data to the disk and a fly height actuator operable to adjust a fly height of the head over the disk; and
control circuitry operable to:
receive a write command to write data to a target data sector of a target data track;
position the head over the target data track; and
when the head approaches the target data sector:
during a pre-heat interval, control the fly height of the actuator to adjust the fly height of the head to a target pre-heat fly height;
after the pre-heat interval and during a pre-laser interval, control the fly height actuator to increase the fly height of the head;
after the pre-laser interval, increase a power applied to the laser to heat the disk, wherein the pre-laser interval compensates for a protrusion transient of the head toward the disk due to increasing the power applied to the laser; and
after increasing the power applied to the laser, write the data to the disk.

2. The disk drive as recited in claim 1, wherein the control circuitry is further operable to control the fly height actuator during the pre-laser interval by decreasing a power applied to the fly height actuator during the pre-laser interval.

3. The disk drive as recited in claim 1, wherein after the pre-laser interval the control circuitry is further operable to control the fly height actuator to maintain a target write fly height while writing the data to the disk.

4. The disk drive as recited in claim 3, wherein the control circuitry is operable to:
control the fly height actuator during the pre-laser interval by decreasing a power applied to the fly height actuator during the pre-laser interval; and after the pre-laser interval, increase the power applied to the fly height actuator to maintain the target write fly height while writing data to the disk.

5. The disk drive as recited in claim 1, wherein the control circuitry is operable to write the data to the disk during the protrusion transient.

6. The disk drive as recited in claim 1, wherein the control circuitry is operable to write the data to the disk after the protrusion transient has substantially settled.

7. The disk drive as recited in claim 1, wherein:
increasing power applied to the fly height actuator causes the head to protrude toward the disk based on a first time constant; and
increasing power applied to the laser causes the head to protrude toward the disk based on a second time constant different from the first time constant.

8. The disk drive as recited in claim 7, wherein the first time constant is greater than the second time constant.

9. The disk drive as recited in claim 7, wherein the pre-laser interval is based on the first time constant and the second time constant.

10. The disk drive as recited in claim 9, wherein the pre-laser interval is based on a ratio of the first time constant to the second time constant.

11. A method of operating a disk drive, the disk drive comprising a head actuated over a disk comprising a plurality of data tracks defined by servo sectors, wherein each data track comprises a plurality of data sectors, wherein the head comprises a laser operable to heat the disk while writing data to the disk and a fly height actuator operable to adjust a fly height of the head over the disk, the method comprising:
receiving a write command to write data to a target data sector of a target data track;
positioning the head over the target data track; and
when the head approaches the target data sector:
during a pre-heat interval, controlling the fly height of the actuator to adjust the fly height of the head to a target pre-heat fly height;
after the pre-heat interval and during a pre-laser interval, controlling the fly height actuator to increase the fly height of the head;
after the pre-laser interval, increasing a power applied to the laser to heat the disk, wherein the pre-laser interval compensates for a protrusion transient of the head toward the disk due to increasing the power applied to the laser; and
after increasing the power applied to the laser, writing the data to the disk.

12. The method as recited in claim 11, further comprising controlling the fly height actuator during the pre-laser interval by decreasing a power applied to the fly height actuator during the pre-laser interval.

13. The method as recited in claim 11, wherein after the pre-laser interval further comprising controlling the fly height actuator to maintain a target write fly height while writing the data to the disk.

14. The method as recited in claim 13, further comprising:
controlling the fly height actuator during the pre-laser interval by decreasing a power applied to the fly height actuator during the pre-laser interval; and
after the pre-laser interval, increasing the power applied to the fly height actuator to maintain the target write fly height while writing data to the disk.

15. The method as recited in claim 11, further comprising writing the data to the disk during the protrusion transient.

16. The method as recited in claim 11, further comprising writing the data to the disk after the protrusion transient has substantially settled.

17. The method as recited in claim 11, wherein:
increasing power applied to the fly height actuator causes the head to protrude toward the disk based on a first time constant; and
increasing power applied to the laser causes the head to protrude toward the disk based on a second time constant different from the first time constant.

18. The method as recited in claim 17, wherein the first time constant is greater than the second time constant.

19. The method as recited in claim 17, wherein the pre-laser interval is based on the first time constant and the second time constant.

20. The method as recited in claim 19, wherein the pre-laser interval is based on a ratio of the first time constant to the second time constant.

* * * * *